United States Patent [19]
Satou et al.

[11] Patent Number: 5,265,259
[45] Date of Patent: Nov. 23, 1993

[54] BLOCKS AND BITS SEQUENCE REVERSING DEVICE USING BARREL SHIFT

[75] Inventors: Shigeki Satou, Yokohama; Taizo Sato, Kawasaki, both of Japan

[73] Assignee: Fujitsu Limited, Kawasaki, Japan

[21] Appl. No.: 547,355

[22] Filed: Jul. 3, 1990

[30] Foreign Application Priority Data

Jul. 5, 1989 [JP] Japan ............................. 1-171887

[51] Int. Cl.$^5$ ........................ G06F 7/00; G06F 5/00; G11C 19/00
[52] U.S. Cl. .............................. 395/800; 395/200; 395/275; 395/325; 395/375; 395/400; 395/425; 395/550; 395/725; 395/775; 364/715.08; 364/926.1; 364/926.5; 364/947; 364/947.3; 364/947.6; 364/931.1; 364/DIG. 2; 377/69
[58] Field of Search ............... 395/425, 800, 400, 275, 395/200, 325, 375, 550, 725; 364/DIG. 1, DIG. 2, 715.08, 926.1, 926.5, 947, 947.3, 947.6, 931.1

[56] References Cited

U.S. PATENT DOCUMENTS

| | | | |
|---|---|---|---|
| 3,226,693 | 12/1965 | Dumey | 395/550 |
| 4,506,364 | 3/1985 | Aichelmann, Jr. et al. | 371/2.2 |
| 4,779,223 | 10/1988 | Asai et al. | 395/425 |
| 4,782,457 | 11/1988 | Cline | 364/715.04 |
| 4,951,226 | 1/1991 | Neki | 395/725 |
| 5,012,441 | 4/1991 | Retter | 395/400 |

FOREIGN PATENT DOCUMENTS

| | | |
|---|---|---|
| 0122016 | 10/1984 | European Pat. Off. |
| 0198341 | 10/1986 | European Pat. Off. |
| 0273637 | 7/1988 | European Pat. Off. |
| 0304615 | 1/1989 | European Pat. Off. |

OTHER PUBLICATIONS

"Data Format and Bus Compatibility in Multiprocessors", 8207 IEEE Micro, vol. 3, (1983), Aug., No. 4, Amsterdam, Nederland.

Primary Examiner—Robert B. Harrell
Assistant Examiner—Dzung C. Nguyen
Attorney, Agent, or Firm—Armstrong, Westerman, Hattori, McLelland & Naughton

[57] ABSTRACT

A bit sequence reversing device for reversing a sequence of data having a plurality of blocks, each block having a predetermined number of bits. The bit sequence reversing device includes a block reversing unit for reversing a sequence of at least two of the blocks; and a plurality of bit reversing units, each corresponding to one of the blocks, each of the bit reversing units reversing a sequence of the bits in the corresponding block. The block reversing unit includes a barrel shift unit. The barrel shift unit includes first and second input latch circuits for receiving the data; a series of left shift registers, connected to the first input circuit, for shifting the output of the first input latch circuit on the left direction, a series of right shift registers, connected to the second input circuit, for shifting the output of the second input latch circuit on the right direction; a first output control circuit, connected to a post-stage of one of the left shift registers, for selectively outputting data thereof; and a second output control circuit, connected to a post-stage of one of the right shift registers, for selectively outputting data thereof. The bit sequence reversing device reduces execution time without increasing the structural elements thereof, and since the reversing operation of blocks is adjusted, various types of reversing operations are possible.

5 Claims, 18 Drawing Sheets

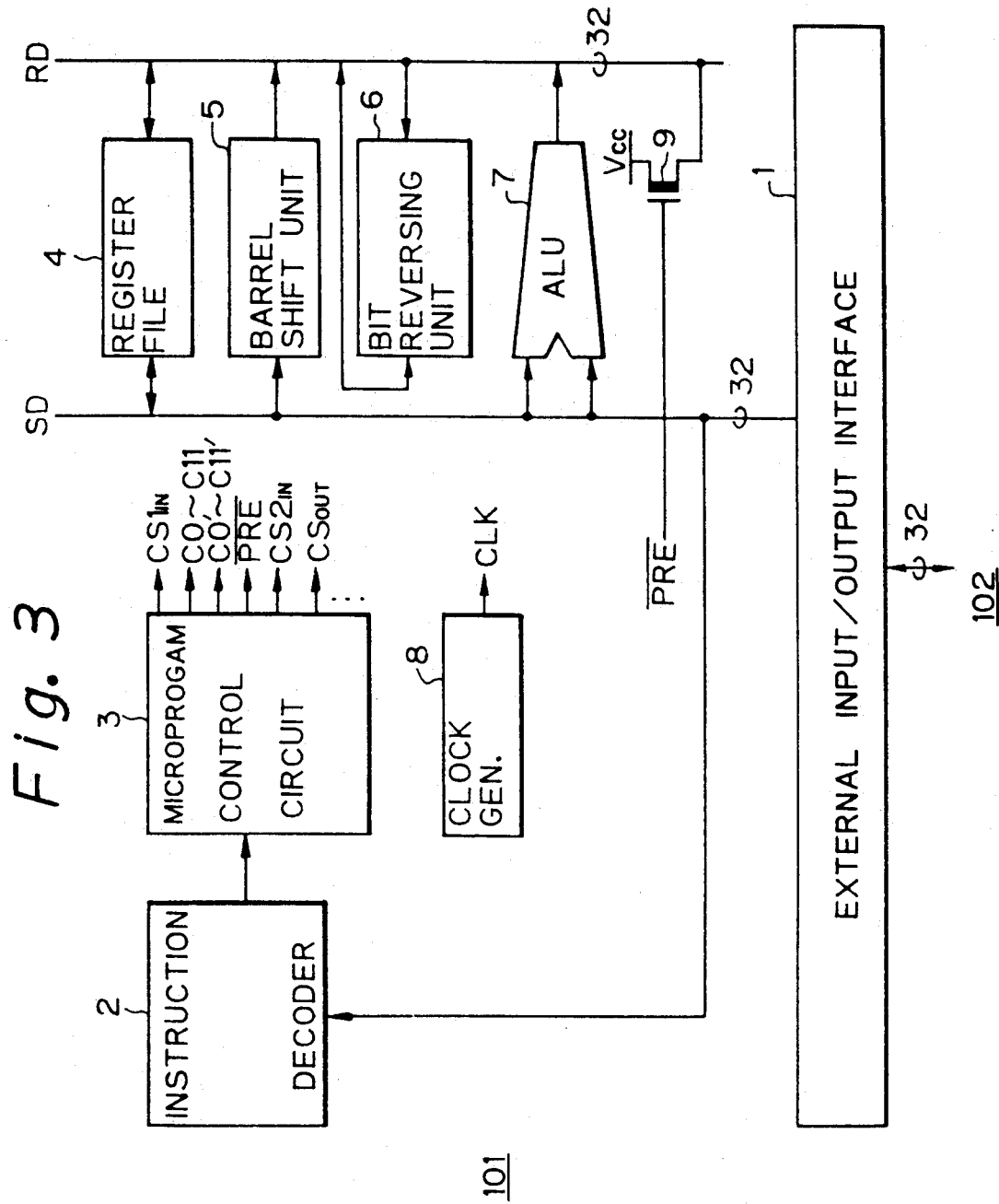

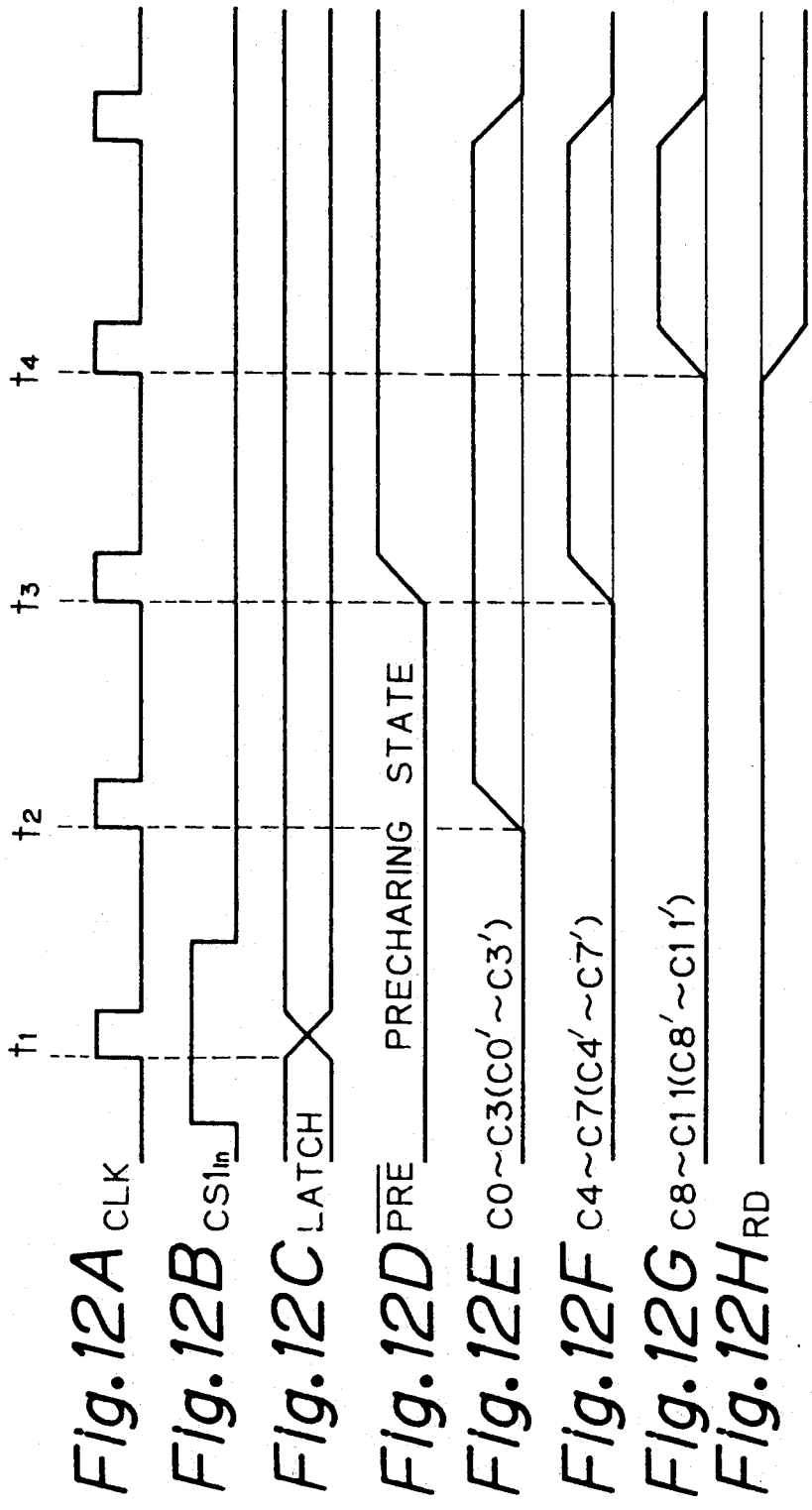

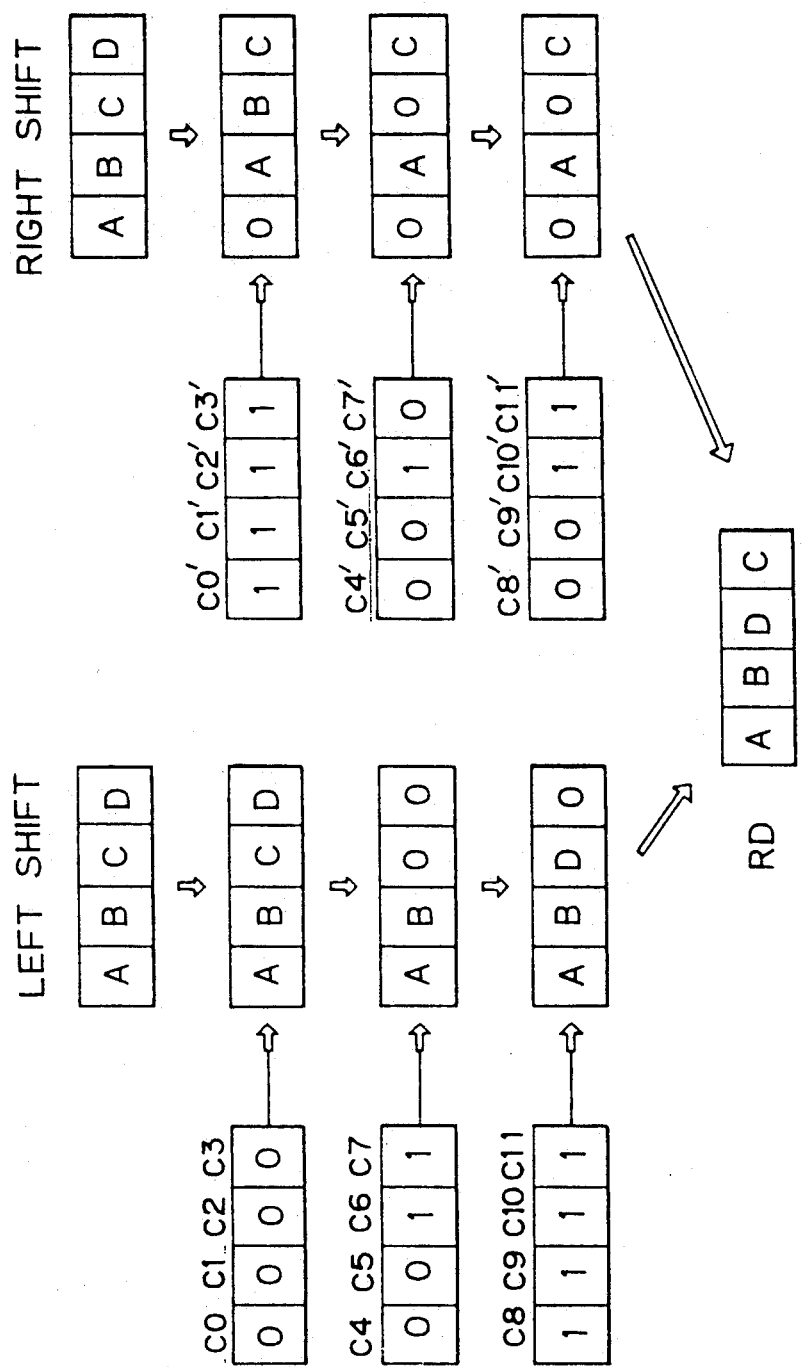

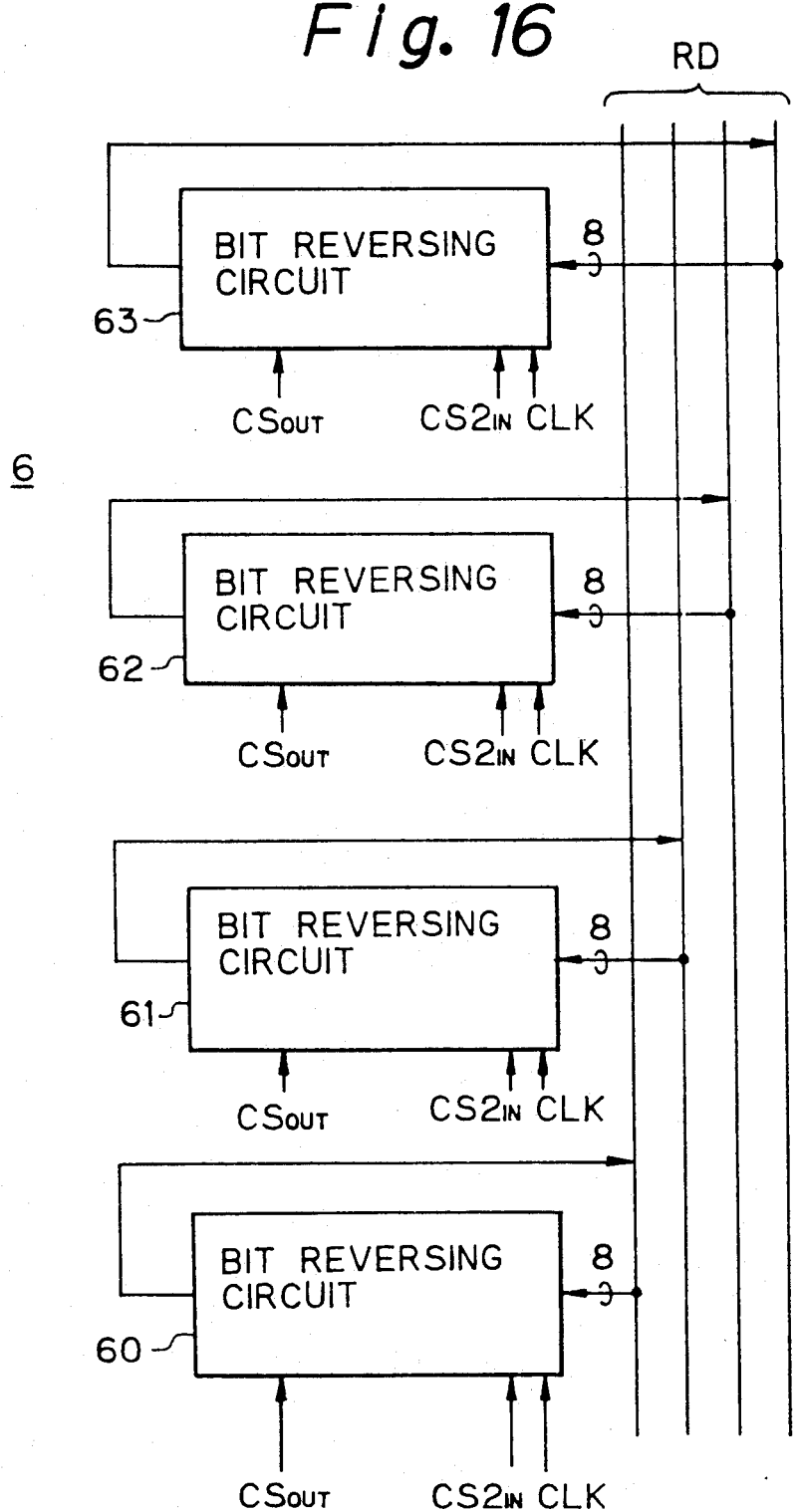

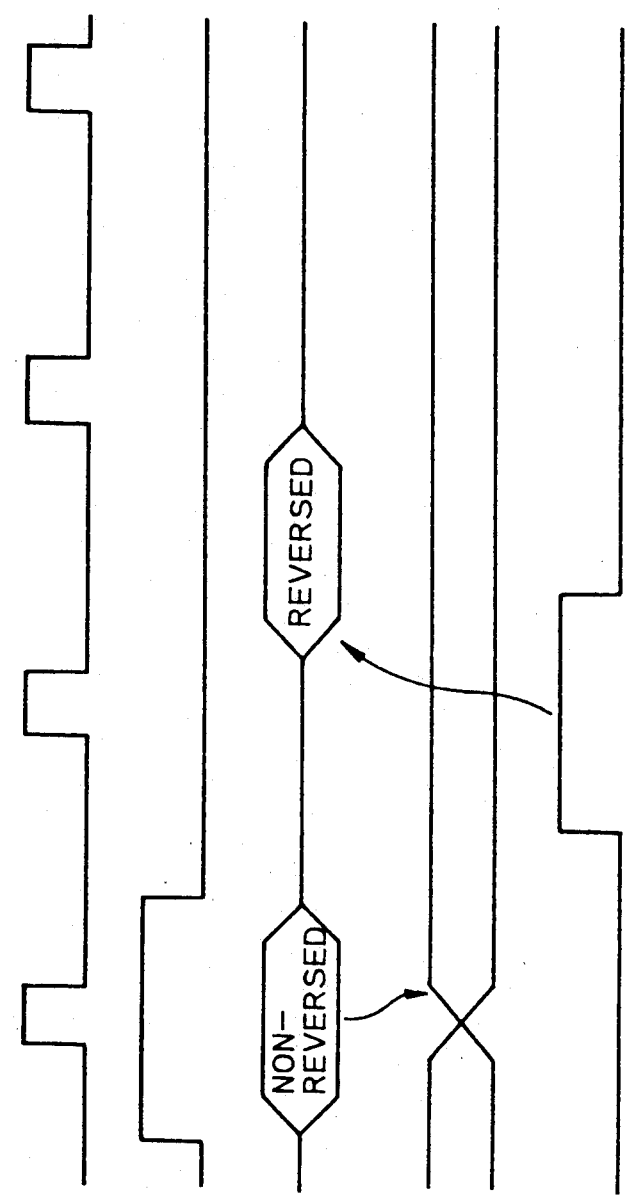

BLOCKS AND BITS SEQUENCE REVERSING DEVICE USING BARREL SHIFT

BACKGROUND OF THE INVENTION

1) Field of the Invention

The present invention relates to a bit sequence reversing device for reversing a sequence of data having a plurality of blocks, each of which has a predetermined number of bits.

2) Description of the Related Art

In a microcomputer system having a plurality of large scale integrated circuits (LSI's), there is usually a difference between the data formats (i.e., the data pins) thereof. For example, a 32-bit microprocessor (MPU) has data pins $D_0$, $D_1$, ..., and $D_{31}$ which have the following weights:

$D_0$: $2^0$ (LSB)

$D_1$: $2^1$

.
.
.

$D_{31}$: $2^{31}$ (MSB)

In this case, the data pin $D_0$ represents a least significant bit (LSB) and the data pin $D_{31}$ represents a most significant bit (MSB). Conversely, a peripheral circuit such as a 32-bit memory control unit (MCU) has data pins $D_0'$, $D_1'$, ... and $D_{31}'$ which have the following weights:

$D_0'$: $2^{31}$ (MSB)

$D_1'$: $2^{30}$

.
.
.

$D_{31}'$: $2^0$ (LSB)

In this case, the data pin $D_0'$ represents an MSB, and $D_{31}'$ represents an LSB. Therefore, when data of the MCU is fetched by the MPU, the MPU has to reverse the bit sequence of the fetched data to conform to the data format of the MPU. This reversion is called "endian conversion".

In the prior art, the above-mentioned reversion of a bit sequence is carried out by pure software in the MPU. According to this software, it is possible to reverse not only all the bits of data (i.e., one word), but also a required half word (16 bits) or a required byte (8 bits). However, this requires a large number of programming steps which invites a long execution time.

In order to reduce such a long execution time, hardware for reversing all the 32-bits of data may be provided in the MPU. In this case, however, it is impossible to adapt the hardware to reverse a half word (16 bits) or a byte (8 bits).

SUMMARY OF THE INVENTION

It is an object of the present invention to provide a bit sequence reversing device which has a short execution time and can be easily modified to carry out various types of reversing operations such as a one-word reversing operation, a half-word reversing operation, and a one-byte reversing operation.

According to the present invention, in a bit sequence reversing device for reversing a sequence of data having a plurality of blocks, each having a predetermined number of bits, at least two of the blocks are reversed by a block reversing unit, and all the bits of each block are then reversed by a plurality of bit reversing units.

In the present invention, since a bit sequence operation is carried out mainly by hardware, an execution time for a reversing operation can be reduced. Also, since the reversion of any blocks can be voluntarily carried out, various types of reversing operations can be easily carried out.

BRIEF DESCRIPTION OF THE DRAWINGS

The present invention will be more clearly understood from the description as set for the below with reference to the accompanying drawings, wherein:

FIG. 3 is a block circuit diagram illustrating an embodiment of the bit sequence reversing device according to the present invention applied to a microcomputer system;

FIGS. 12A, 12B, 12C, 12D, 12E, 12F, 12G, and 12H are timing diagrams explaining the operation of the circuit of FIG. 4;

FIGS. 14A, 14B, 14C, 14D and 14E are diagrams explaining the operation of the circuit of FIG. 4 where a block reversing operation is carried out for a half-word reversion;

FIG. 16 is a block circuit diagram of the bit reversing unit of FIG. 3;

FIGS. 18A, 18B, 18C, 18D and 18E are timing diagrams explaining the operation of the circuit of FIG. 17.

DESCRIPTION OF THE PREFERRED EMBODIMENT

Figure 1:
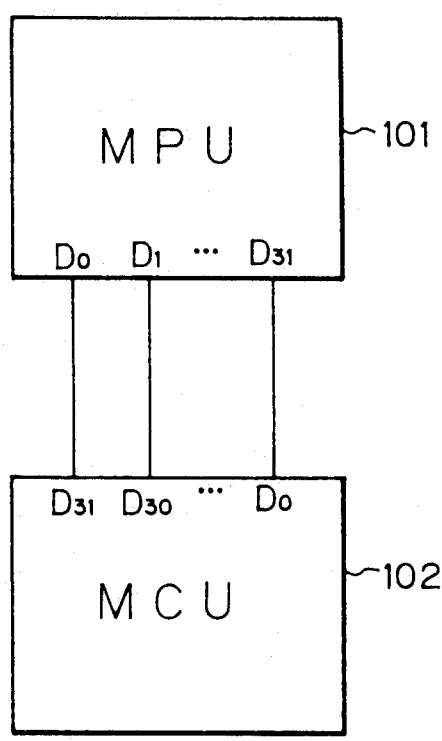
FIG. 1 is a block circuit diagram illustrating a general microcomputer system.

In FIG. 1, which illustrates a general microcomputer system, reference numeral 102 designates a 32-bit microprocessor (MPU), and 102 designates a 32-bit memory control unit (MCU). Note that other peripheral circuits are of course present, but the illustration thereof is omitted. The MPU 101 has data pins $D_0, D_1, \ldots,$ and $D_{31}$ which have the following weights:

$D_0$: $2^0$ (LSB)

$D_1$: $2^1$

.
.
.

$D_{31}$: $2^{31}$ (MSB).

Also, the MCU 102 has data pins $D_0', D_1', \ldots,$ and $D_{31}'$ which have the following weights:

$D_0'$: $2^{31}$ (MSB)

$D_1'$: $2^{30}$

.
.
.

$D_{31}'$: $2^0$ (LSB)

Figure 2A:
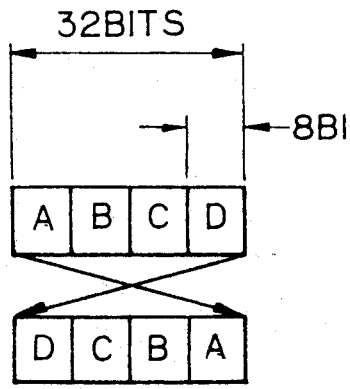
FIGS. 2A, 2B, and 2C are views illustrating various types of reversing operations.
Figure 2B:
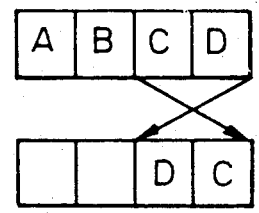
Figure 2C:
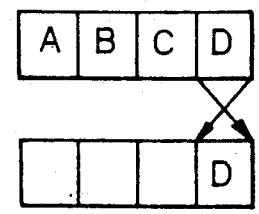

Therefore, when data of the MCU 102 is fetched by the MPU 101, the MPU 101 has to carry out a bit reversing operation as illustrated in FIGS. 2A, 2B, and 2C.

For example, if all of the 32 bits (one word) are required in the MPU 101, the MPU 101 carries out a bit reversing operation as illustrated in FIG. 2A. That is, all of the blocks A, B, C, and D, each of which includes 8 bit data, are reversed, and also the bit sequences of the blocks A, B, C, and D are reversed.

If only 16 bits (half word) are required in the MPU 101, the MPU 101 carries out a bit reversing operation as illustrated in FIG. 2B. That is, the blocks C and D are reversed, and also the bit sequences of the blocks C and D are reversed.

If only 8 bits (one byte) are required in the MPU 101, the MPU 101 carries out a bit reversing operation as illustrated in FIG. 2C. That is, only the bit sequence of the block D is reversed.

The above-mentioned three types of reversing operations are carried out in the MPU 101 as illustrated in FIG. 3 which includes an embodiment of the bit sequence reversing device according to the present invention. In FIG. 3, reference numeral 1 designates an external input/output interface with peripheral circuits such as the MCU 102 and 2 designates an instruction decoder for decoding an instruction on a data bus SD which is also connected to the external input/output interface 1. Upon receipt of instructions from the instruction decoder 1, a microprogram control circuit 3 generates various control signals such as $CS1_{in}$, C0 to C11, C0' to C11', PRE, $CS2_{in}$, $CS_{out}$, and the like, which are supplied to various units within the MPU 101.

Also, reference numeral 4 designates a register file including various registers, 5 a barrel shift unit, 6 a bit reversing unit, 7 an arithmetic-logic unit (ALU), and 8 a clock generator for generating various clock signals such as CLK to synchronize the operation of the units within the MPU 101.

Further, reference numeral 9 designates a precharging transistor formed by a depletion type transistor for precharging a data bus RD. In this case, since the data bus RD is a 32-bit bus, 32 of the precharging transistors are required, but only one transistor is illustrated for simplification.

The bit sequence reversing device according to the present invention is constituted by the barrel shift unit 5 which serves as a block reversing circuit and the bit reversing unit 6.

The barrel shift unit 5 of FIG. 3 is explained with reference to FIG. 4. That is, the barrel shift unit 5 includes an input latch circuit 51 for receiving 32-bit data from the data bus SD, a 16-bit left shift register 52 for shifting the output data of the input latch circuit 51 in the left direction by 16 bits (i.e., two blocks), an 8-bit left shift register 53 for shifting the output data of the 16-bit left shift register 52 in the left direction by 8 bits (i.e., one block), and a left output control circuit 54 for outputting the output data of the 8-bit left shift register 53 to the data bus RD. Also, the barrel shift unit 5 includes an input latch circuit 51' for receiving 32-bit data from the data bus SD, an 8-bit right shift register 52' for shifting the output data of the input latch circuit 51' in the right direction by 8 bits (i.e., one block), a 16-bit right shift register 53' for shifting the output data of the 8-bit right shift register 52 in the right direction by 16 bits (i.e., two blocks), and a right output control circuit 54' for outputting the output data of the 16-bit right shift register 53' to the data bus RD.

The elements 54 to 57 and 51' to 54' of the barrel shift unit 5 are explained with reference to FIGS. 5 through 11.

Figure 4:
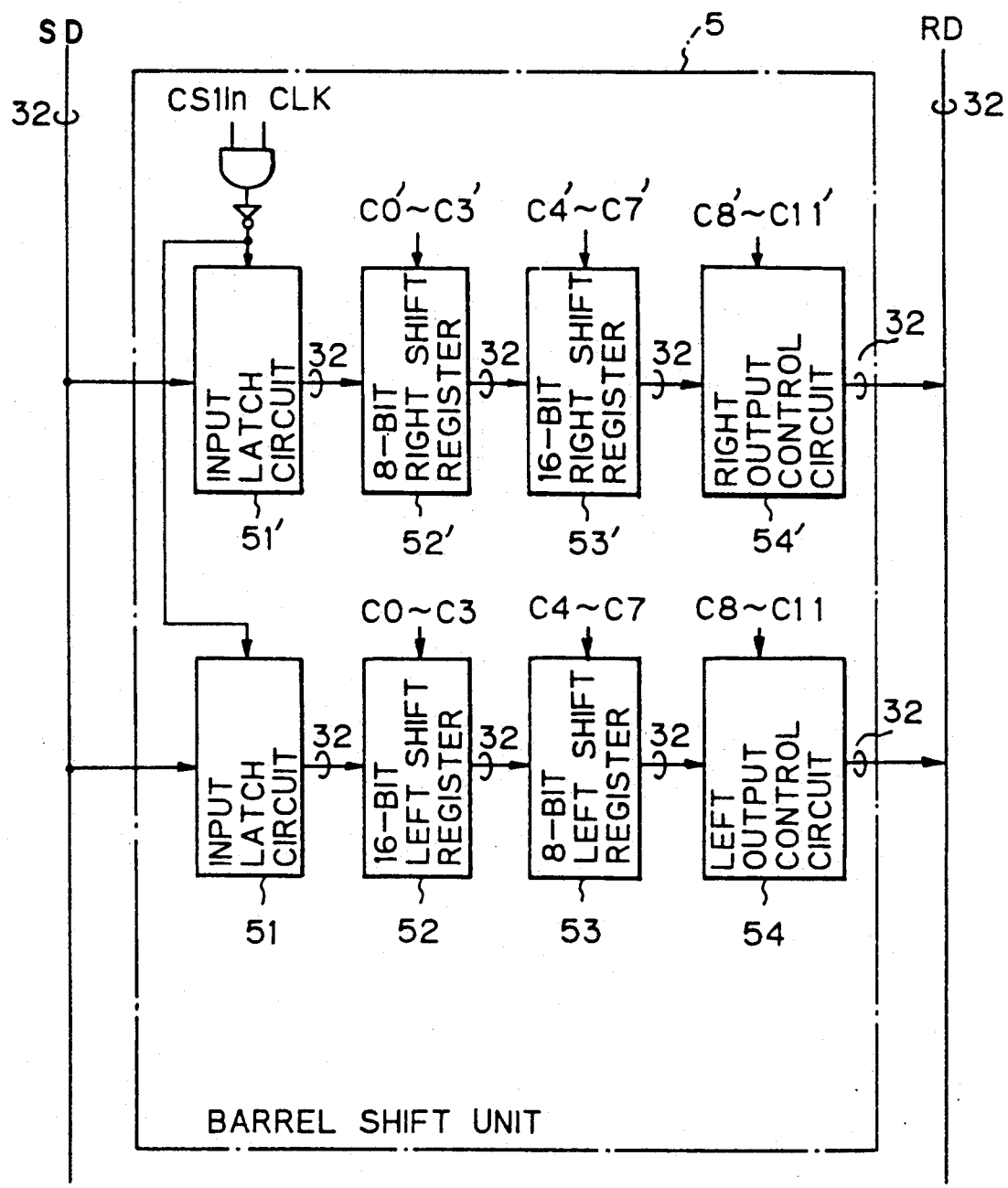
Figure 5A:
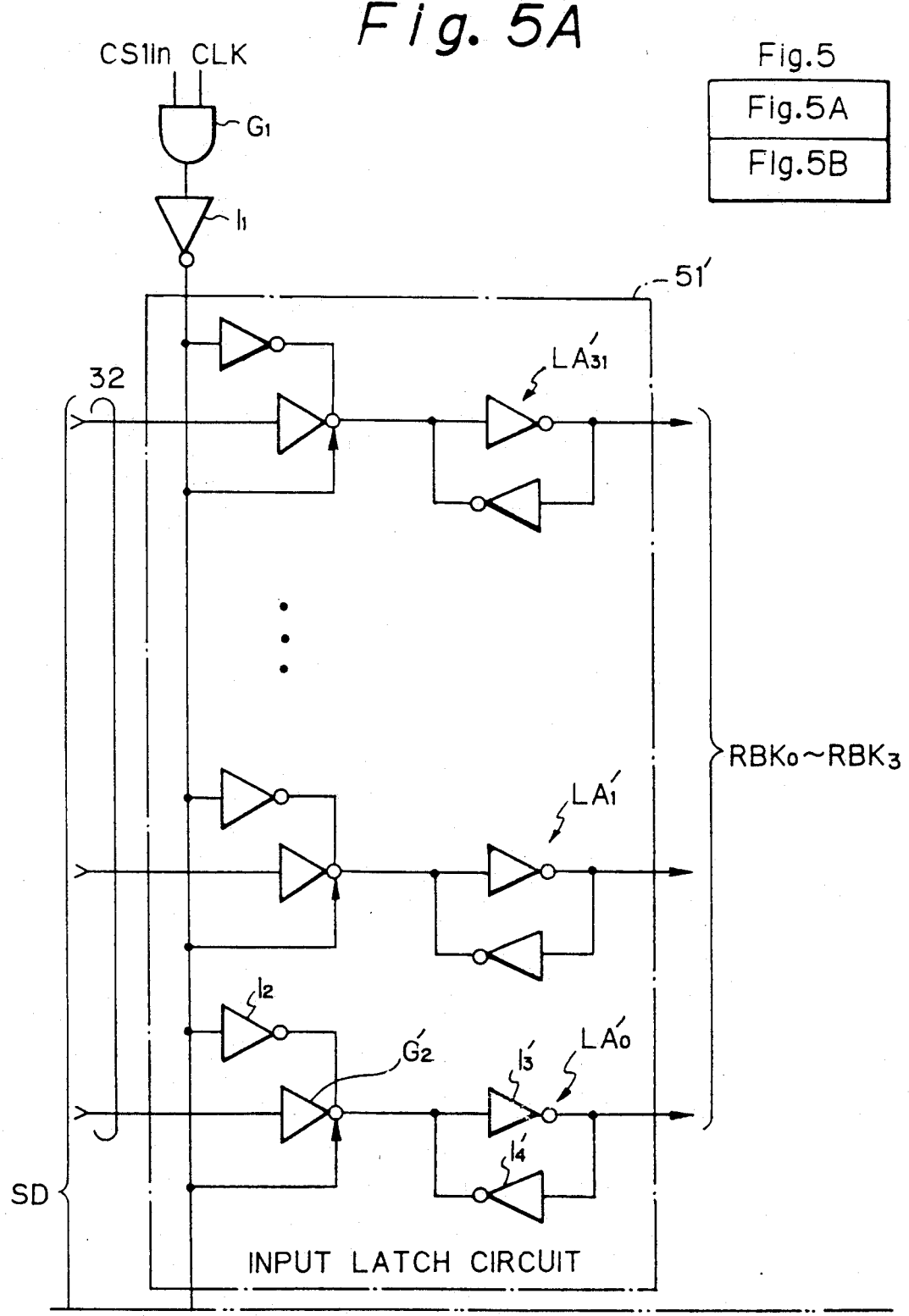
FIG. 5A, and 5B are a block circuit diagram of the input latch circuits of FIG. 4.
Figure 5B:
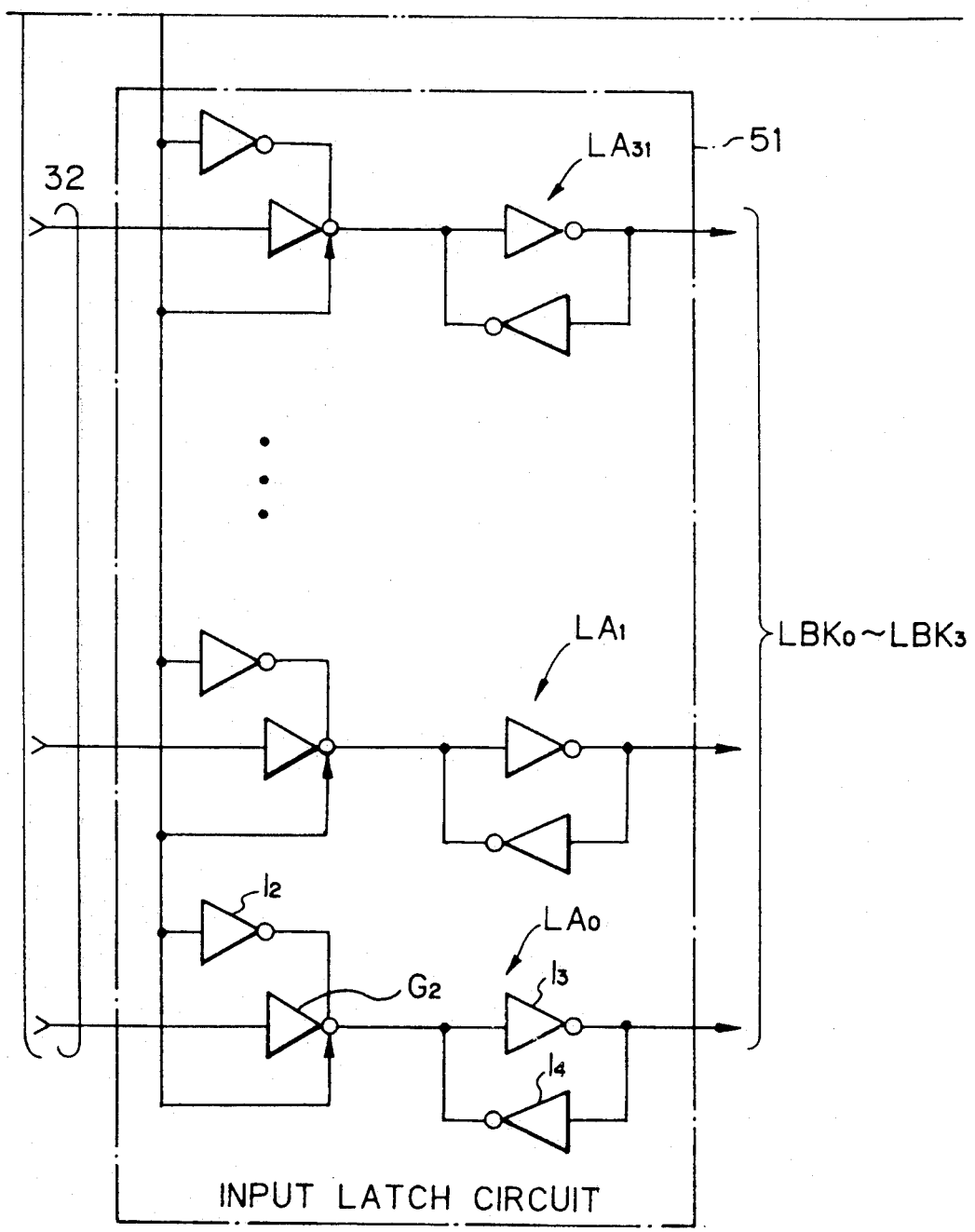

In FIG. 5A and 5B which are a detailed circuit diagram of the input latch circuits 51 and 51' of FIG. 4, the circuits 51 and 51' are simultaneously enabled by an output of a combination of an AND circuit $G_1$ and an inverter $I_1$ when both of the control signal $CS1_{in}$ and the clock signal CLK are high. The input latch circuit 51 includes thirty-two latches $LA_0$ through $LA_{31}$ each of which is formed by an inverter $I_2$, a clocked-inverter $G_2$, and inverters $I_3$ and $I_4$. Similarly, the input latch circuit 51' includes thirty-two latches $LA_0'$ through $LA_{31}'$ each of which is formed by an inverter $I_2'$, clocked-inverter $G_2'$, and inverters $I_3'$ and $I_4'$. Thus, the input latch circuit 51 latches four left block data $LBK_0$ to $LBK_3$ from the data bus SD, and the input latch circuit 51' latches four right block data $RBK_0$ to $RBK_3$ from the data bus SD. In this case, each of the block data is 8-bit data, and the left block data $LBK_0$ to $LBK_3$ are the same as the right block data $RBK_0$ to $RBK_3$, respectively.

Figure 6:
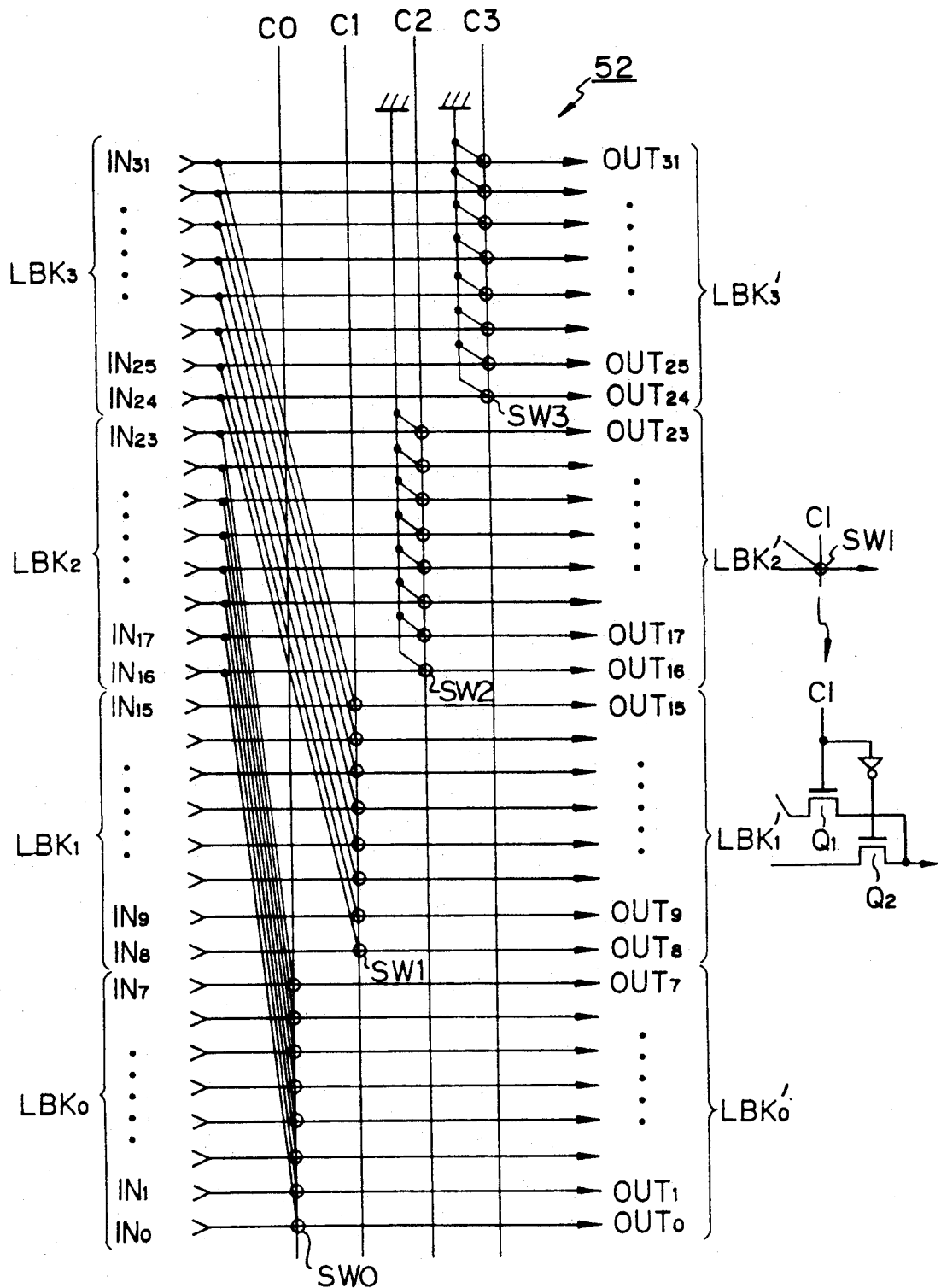
FIG. 6 is a circuit diagram of the 16-bit left shift unit of FIG. 4.

In FIG. 6, which is a detailed circuit diagram of the 16-bit left shift unit 52 of FIG. 4, inputs $IN_0, IN_1, \ldots,$ and $IN_7$, i.e., the left block $LBK_0$ of the input latch circuit 51 and inputs $IN_{16}, IN_{17}, \ldots,$ and $IN_{23}$, i.e., the left block $LBK_2$ of the input latch circuit 51 are connected by switches $SW_0$ to outputs $OUT_0, OUT_1, \ldots,$ and $OUT_7$, respectively, which form a left block $LBK_0'$. Similarly, inputs $IN_8, IN_9, \ldots,$ and $IN_{15}$, i.e., the left block $LBK_1$ of the input latch circuit 51 and inputs $IN_{24}, IN_{25}, \ldots,$ and $IN_{31}$, i.e., the left block $LBK_3$ of the input latch circuit 51 are connected by switches $SW_1$ to outputs $OUT_8, OUT_9, \ldots,$ and $OUT_{15}$, respectively, which form a left block $LBK_1'$. Also, inputs $IN_{16}, IN_{17}, \ldots,$ and $IN_{23}$, i.e., the left block $LBK_2$ of the input latch circuit 51 and the ground terminal are connected by switches $SW_3$ to outputs $OUT_{16}, OUT_{17}, \ldots,$ and $OUT_{18}$, respectively, which form a left block $LBK_2'$. Similarly, inputs $IN_{24}, IN_{25}, \ldots,$ and $IN_{31}$, i.e., the left block $LBK_3$ of the input latch circuit 51 and the ground terminal are connected by switches SW3 to outputs $OUT_{24}$, $OUT_{25}$, ..., and $OUT_{31}$, respectively, which form a left block $LBK_3'$.

The switches SW0 to SW3, each of which is formed by two enhancement-type transistors $Q_1$ and $Q_2$, are controlled by the control signal C0 to C3, respectively, supplied from the microprogram control circuit 3.

That is, when the control signal $C_i$ (i=0-3) is low, the left block $LBK_i$ (i=0-3) becomes the left block $LBK_i$ (i=0-3), i.e., no left shift operation is carried out. Conversely, when the control signal C0 or C1 is high, the left block $LBK_2$ or $LBK_3$ becomes the left block $LBK_0'$ or $LBK_1'$, i.e., a 16-bit left shift operation is carried out. Also, when the control signal C2 or C3 is high, the left block $LBK_2'$ or $LBK_3'$ is grounded.

Figure 7:
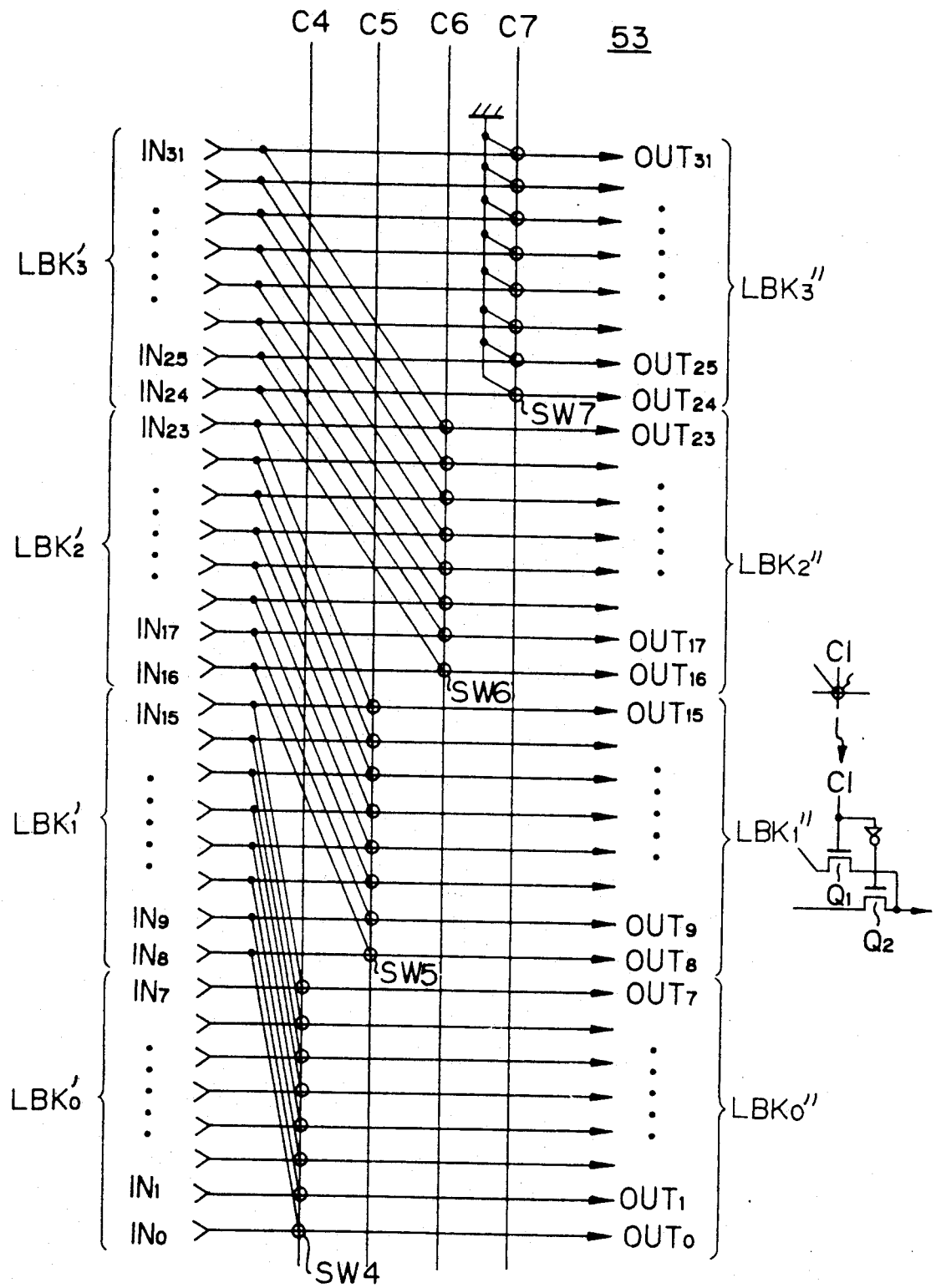
FIG. 7 is a circuit diagram of the 8-bit left shift unit of FIG. 4.

In FIG. 7, which is a detailed circuit diagram of the 8-bit left shift unit 53 of FIG. 4, inputs $IN_0$, $IN_1$, ..., and $IN_7$, i.e., the left block $LBK_0'$ of the 16-bit left shift unit 52 and inputs $IN_8$, $IN_9$, ..., and $IN_{15}$, i.e., the left block $LBK_1'$ of the 16-bit left shift unit 52 are connected by switches SW4 to outputs $OUT_0$, $OUT_1$, ..., and $OUT_7$, respectively, which form a left block $LBK_0''$. Similarly, inputs $IN_8$, $IN_9$, ..., and $IN_{15}$, i.e., the left block $LBK_1'$ of the 16-bit left shift unit 52 and inputs $IN_{16}$, $IN_{17}$, ..., and $IN_{23}$, i.e., the left block $LBK_2'$ of the 16-bit left shift unit 52 are connected by switches SW5 to outputs $OUT_8$, $OUT_9$, ..., and $OUT_{10}$, respectively, which form a left block $LBK_1''$. Similarly, inputs $IN_{17}$, $IN_{18}$, ..., and $IN_{23}$, i.e., the left block $LBK_2'$ of the 16-bit left shift unit 52 and inputs $IN_{24}$, $IN_{25}$, ..., and $IN_{31}$, i.e., the left block $LBK_3'$ of the 16-bit left shift unit 52 are connected by switches SW6 to outputs $OUT_{16}$, $OUT_{17}$, ..., and $OUT_{23}$, respectively, which form a left block $LBK_2''$. Also, inputs $IN_{24}$, $IN_{25}$, ..., and $IN_{31}$, i.e., the left block $LBK_3'$ of the 16-bit left shift unit 52 and the ground terminal are connected by switches SW7 to outputs $OUT_{24}$, $OUT_{25}$, ..., and $OUT_{31}$, respectively, which form a left block $LBK_3''$.

The switches SW4 to SW7, each of which is also formed by two enhancement-type transistors $Q_1$ and $Q_2$, are controlled by the control signal C4 to C7, respectively, supplied from the microprogram control circuit 3.

That is, when the control signal $C_i$ (i=4-7) is low, the left block $LBK_i$ (i=4-7) becomes the left block $LBK_i''$ (i=4-7), i.e., no left shift operation is carried out. Conversely, when the control signal C4, C5, or C6 is high, the left block $LBK_1'$, $LBK_2'$ or $LBK_3'$ becomes the left block $LBK_0''$, $LBK_1''$ or $LBK_2''$, i.e., an 8-bit left shift operation is carried out. Also, when the control signal C7 is high, the left block $LBK_3''$ is grounded.

Figure 8:
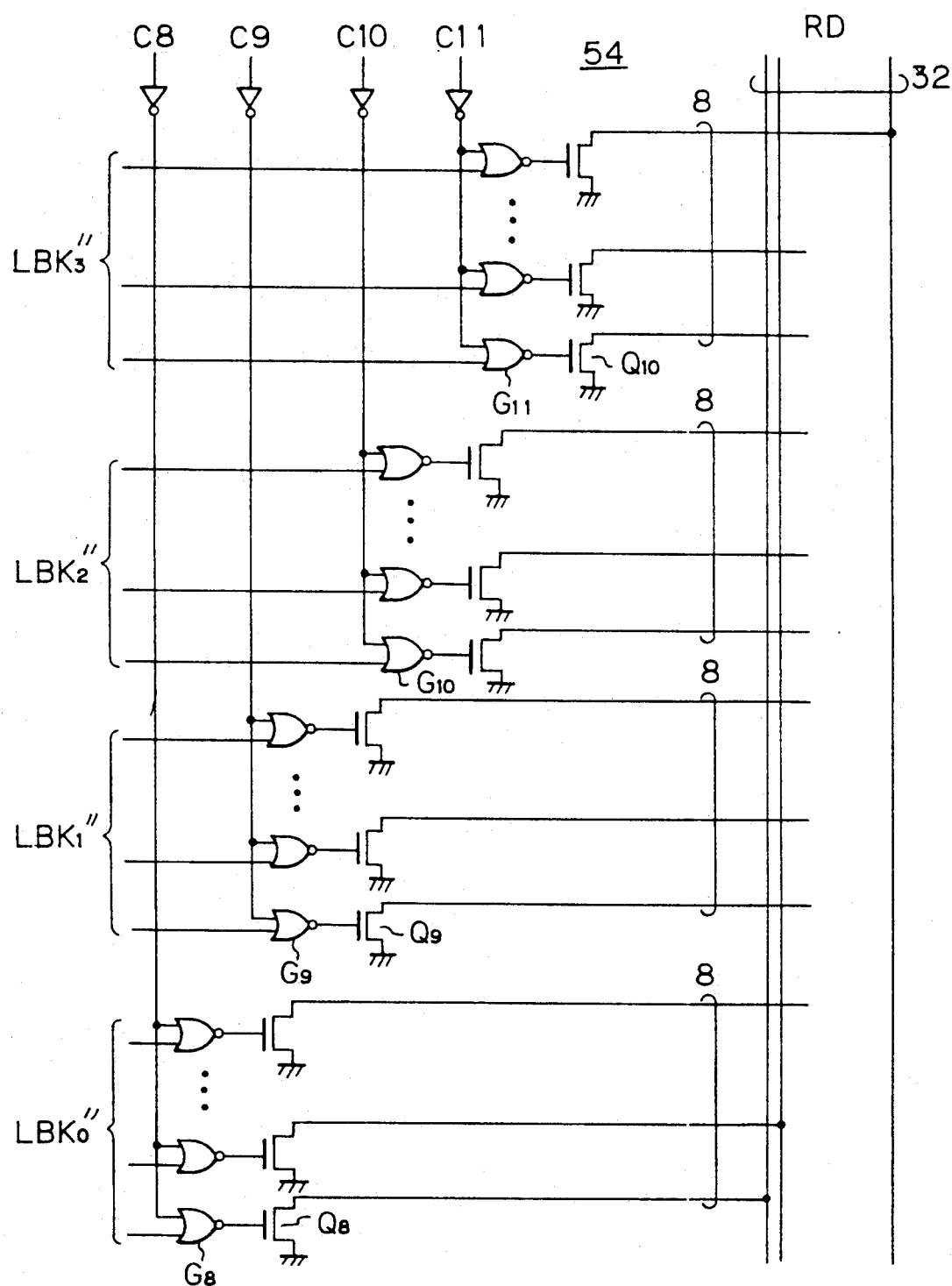
FIG. 8 is a circuit diagram of the left output control circuit of FIG. 4.

In FIG. 8, which is a detailed circuit diagram of the left output control circuit 54 of FIG. 4, a NOR circuit $G_8$ and an enhancement type transistor $Q_8$ are connected between each bit of the left block $LBK_0''$ of the 8-bit left shift unit 53 and a corresponding bit of the data bus RD; a NOR circuit $G_9$ and an enhancement-type transistor $Q_9$ are connected between each bit of the left block $LBK_1''$ of the 8-bit left shift unit 53 and a corresponding bit of the data bus RD; a NOR circuit $G_{10}$ and an enhancement-type transistor $Q_{10}$ are connected between each bit of the left block $LBK_2''$ of the 8-bit left shift unit 53 and a corresponding bit of the data bus RD; and a NOR circuit $G_{10}$ and an enhancement-type transistor $Q_{10}$ are connected between each bit of the left block $LBK_3''$ of the 8-bit left shift unit 53 and a corresponding bit of the data bus RD.

The NOR circuits $G_8$, $G_9$, $G_{10}$, and $G_{11}$ are controlled by the control signals C8, C9, C10, and C11, respectively.

That is, when the control signal $C_i$ (i=8-11) is low, the NOR circuits $G_i$ (i=8-11) generate low potential signals, so that the transistors $Q_i$ (i=8-11) are in a high-impedance state. Conversely, when the control signal $C_i$ (i=8-11) is high, the NOR circuits $G_i$ (i=8-11) generate inverted signals of the left block $LBK_i$ (i=8-11), so that the transistors $Q_i$ (i=8-11) generate data of the left block $LBK_i$ (i=8-11) and transmit them to the corresponding bits of the data bus RD.

Figure 9:
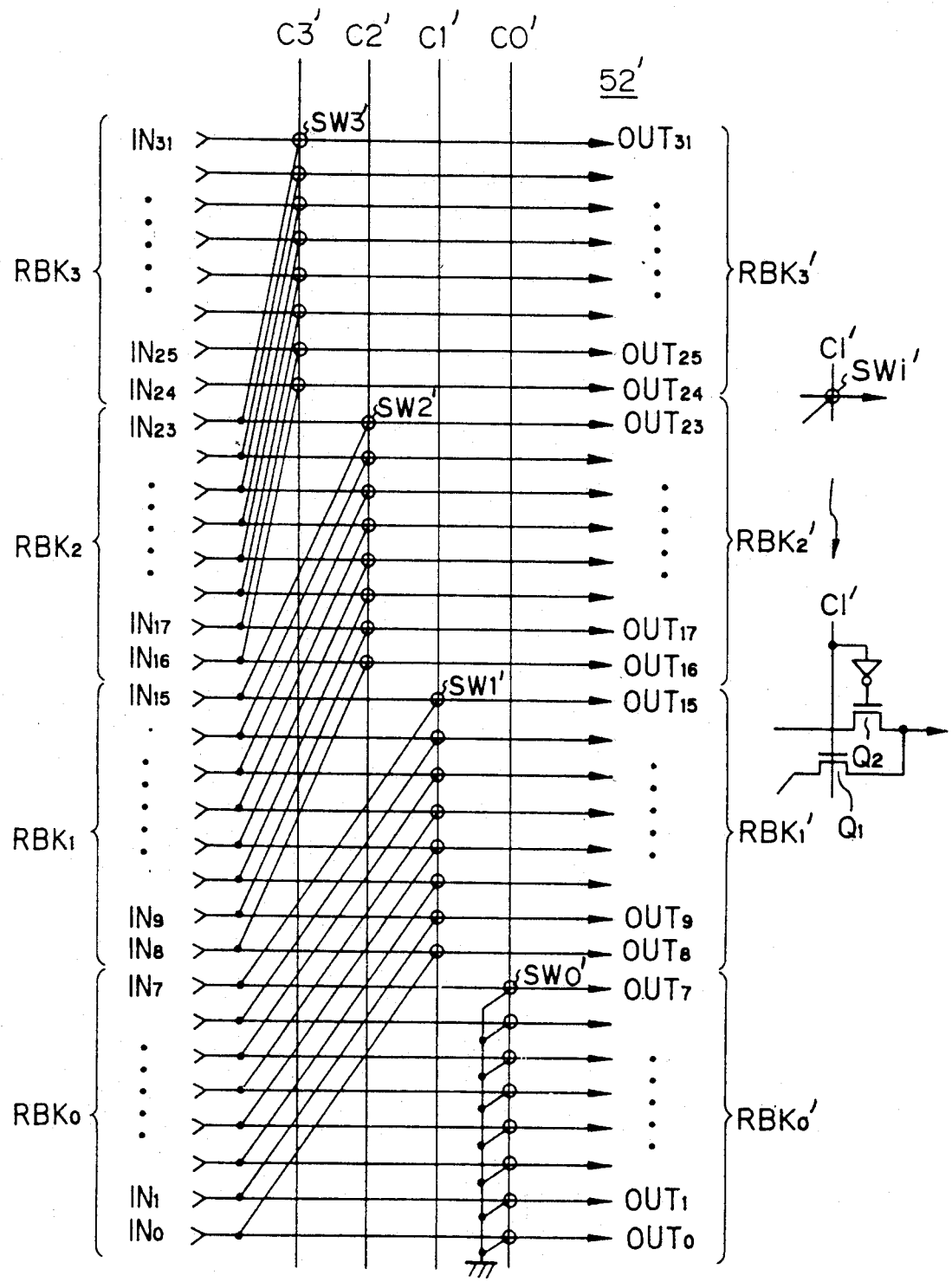
FIG. 9 is a circuit diagram of the 8-bit right shift unit of FIG. 4.

In FIG. 9, which is a detailed circuit diagram of the 8-bit right shift unit 52' of FIG. 4, inputs $IN_0$, $IN_2$, ..., and $IN_7$, i.e., the right block $RBK_0$ of the input latch circuit 51' and the ground terminal connected by switches SW0' to outputs $OUT_0$, $OUT_1$, ..., and $OUT_7$, respectively, which form a right block $RBK_0'$. Also, inputs $IN_8$, $IN_9$, ..., and $IN_{15}$, i.e., the right block $RBK_1$ of the input latch circuit 51' and inputs $IN_0$, $IN_1$, ..., and $IN_7$, i.e., the right block $RBK_0$ of the input latch circuit 51' are connected by switches SW1' to outputs $OUT_8$, $OUT_9$, ..., and $OUT_{15}$, respectively, which form a right block $RBK_1'$. Similarly, inputs $IN_{16}$, $IN_{17}$, ..., and $IN_{23}$, i.e., the right block $RBK_2$ of the input latch circuit 51' and inputs $IN_8$, $IN_9$, ..., and $IN_{15}$, i.e., the right block $RBK_1$ of the input latch circuit 51' are connected by switches SW2' to outputs $OUT_{16}$, $OUT_{17}$, ..., and $OUT_{23}$, respectively, which form a right block $RBK_2$. Similarly, inputs $IN_{24}$, $IN_{25}$, ..., and $IN_{31}$, i.e., the right block $RBK_2$ of the input latch circuit 51' and inputs $IN_{16}$, $IN_{17}$, ..., and $IN_{23}$, i.e., the right block $RBK_2$ of the input latch circuit 51' are connected by switches SW3' to outputs $OUT_{24}$, $OUT_{25}$, ..., and $OUT_{31}$, respectively, which form a right block $RBK_3'$.

The switches SW0' to SW1' each of which is also formed by two enhancement-type transistors $Q_1$ and $Q_2$, are controlled by the control signal C0' to C3', respectively, supplied from the microprogram control circuit 3.

That is, when the control signal C0' is high, the right block $RBK_3'$ is grounded. Also, when the control signal $C_i'$ (i=0-3) is low, the right block $RBK_i'$ (i=0-3) becomes the right block $RBK_i$, (i=0-3), i.e., no right shift operation is carried out. Conversely, when the control signal C0', C1', or C2' is high, the right block $RBK_1$, $RBK_2$ or $RBK_3$ becomes the right block $RBK_0$, $RBK_1'$ or $RBK_2'$, i.e., an 8-bit right shift operation is carried out.

Figure 10:
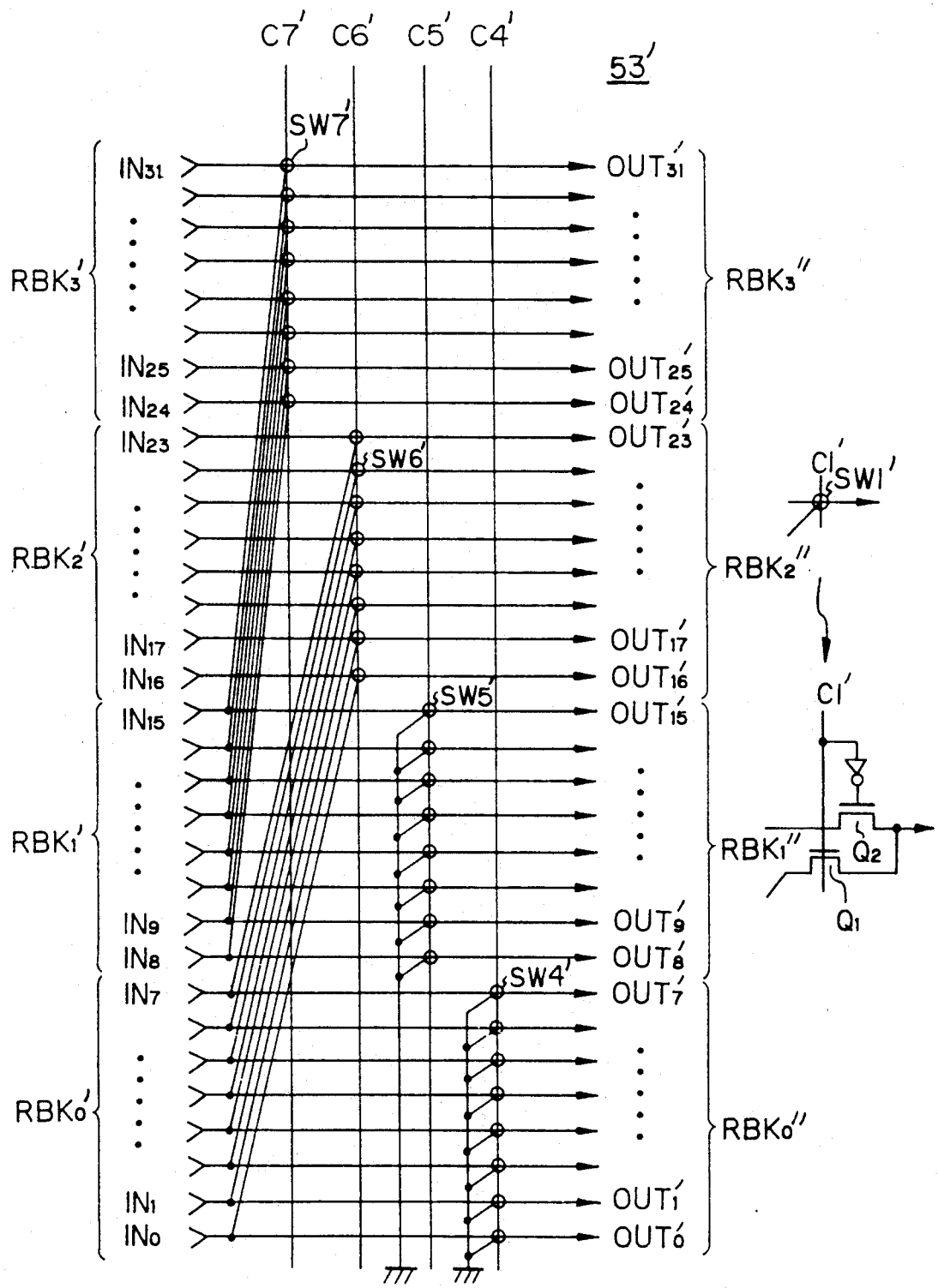
FIG. 10 is a circuit diagram of the 16-bit right shift unit of FIG. 4.

In FIG. 10, which is a detailed circuit diagram of the 16-bit right shift unit 53' of FIG. 4, inputs $IN_0$, $IN_1$, ..., and $IN_7$, i.e., the right block $RBK_0'$ of the 8-bit right shift unit 52' and the ground terminal are connected by switches SW4' to outputs $OUT_0'$, $OUT_1$, ..., and $OUT_7'$, respectively, which form a right block $RBK_0''$. Similarly, inputs $IN_8$, $IN_9$, ..., and $IN_{15}$, i.e., the right block $RBK_1'$ of the 8-bit right shift unit 52' and the ground terminal are connected by switches SW5' to outputs $OUT_8'$, $OUT_9'$, ..., and $OUT_{15}'$, respectively, which form a right block $RBK_1''$. Similarly, inputs $IN_{16}$, $IN_{17}$, ..., and $IN_{23}$, i.e., the right block $RBK_2'$ of the 8-bit left shift unit 52' and inputs $IN_0$, $IN_1$, ..., and $IN_7$, i.e., the right block $RBK_0'$ of the 8-bit right shift unit 52' are connected by switches SW6' to outputs $OUT_{16}'$, $OUT_{17}'$, ..., and $OUT_{23}'$, respectively, which form a right block $RBK_2''$. Similarly, inputs $IN_{24}$, $IN_{25}$, ..., and $IN_{31}$, i.e., the right block $RBK_3'$ of the 8-bit right shift unit 52' and inputs $IN_8$, $IN_9$, ..., and $IN_{15}$, i.e., the right block RBK' of the 8-bit right shift unit 52' are connected by switches SW7' to outputs OUT$_{24}$', OUT$_{25}$', ..., and OUT$_{31}$', respectively, which form a right block RBK$_3$".

The switches SW4' to SW7' each of which is formed by two enhancement-type transistors Q$_1$ and Q$_2$, are controlled by the control signal C4' to C7', respectively, supplied from the microprogram control circuit 3.

That is, when the control signal Ci' (i=4-7) is low, the right block RBK$_i$' (i=4-7) becomes the right block RBK$_i$" (i=4-7), i.e., no left shift operation is carried out. Conversely, when the control signal C4' or C5' the right block RBK$_0$" or RBK$_1$" is grounded. Also, when the control signal C6' or C7' is high, the right block RBK$_2$' or RBK$_3$' becomes the right block RBK$_0$" or RBK$_1$", i.e., a 16-bit right shift operation is carried out.

Figure 11:
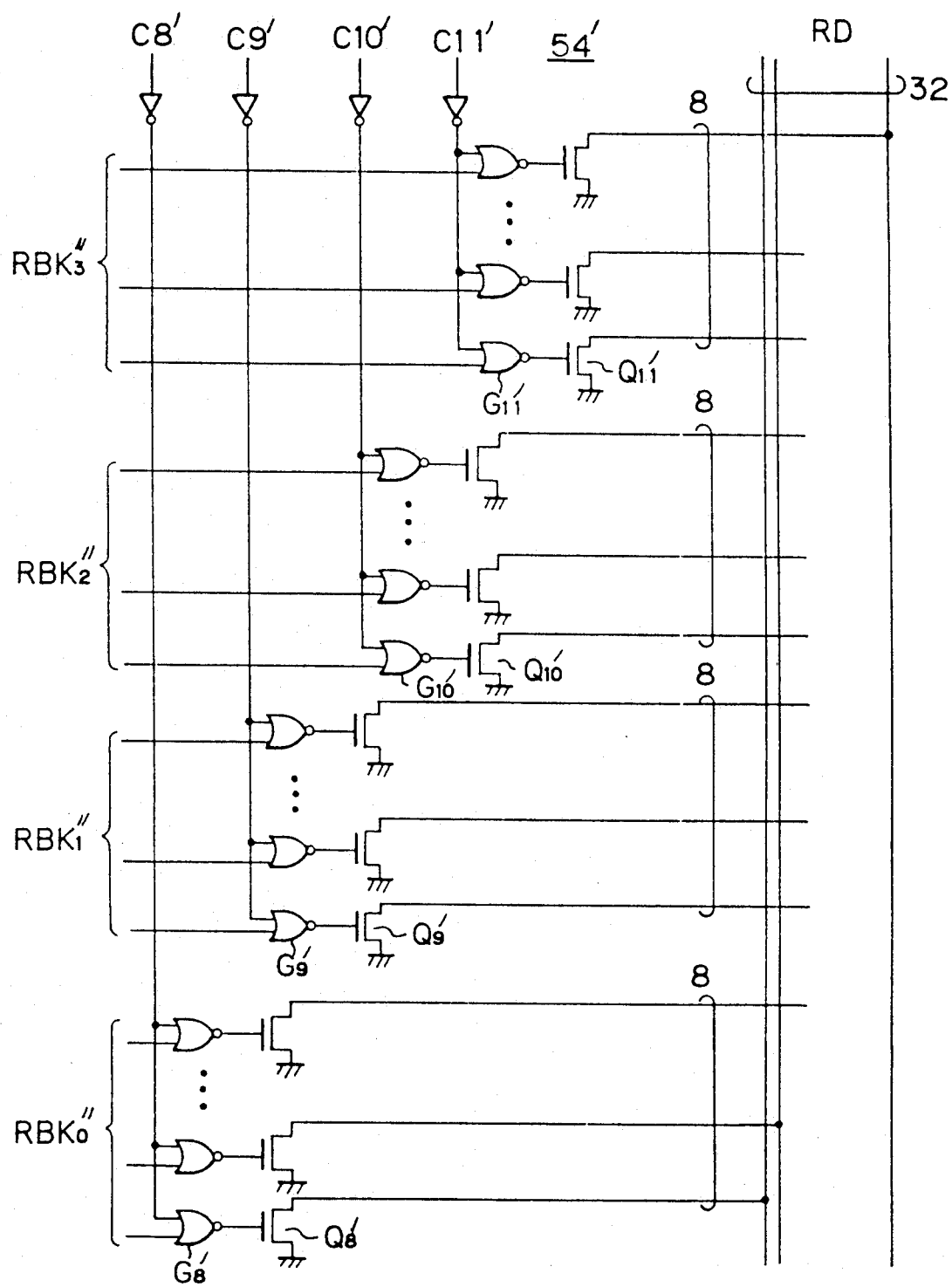
FIG. 11 is a circuit diagram of the right output control circuit of FIG. 4.

In FIG. 11, which is a detailed circuit diagram of the right output control circuit 54' of FIG. 4, a NOR circuit G$_8$' and an enhancement-type transistor Q$_8$' are connected between each bit of the right block RBK$_0$" of the 16-bit right shift unit 53' and a corresponding bit of the data bus RD; a NOR circuit G$_9$' and an enhancement-type transistor Q$_9$' are connected between each bit of the right block RBK$_1$" of the 16-bit right shift unit 53' and a corresponding bit of the data bus RD; a NOR circuit G$_{10}$' and an enhancement-type transistor Q$_{10}$' are connected between each bit of the right block RBK$_2$" of the 16-bit right shift unit 53' and a corresponding bit of the data bus RD; and a NOR circuit G$_{10}$' and an enhancement-type transistor Q$_{10}$' are connected between each bit of the right block RBK$_3$" of the 16-bit right shift unit 53' and a corresponding bit of the data bus RD.

The NOR circuits G$_8$', G$_9$', G$_{10}$', and G$_{11}$' are controlled by the control signals C8', C9', C10', and C11', respectively.

That is, when the control signal Ci' (i=8-11) is low, the NOR circuits Gi (i=8-11) generate low potential signals, so that the transistors Qi, (i=8-11) are in a high-impedance state. Conversely, when the control signal Ci, (i=8-11) is high, the NOR circuits Gi' (i=-8-11) generate inverted signals of the right block RBK$_i$ (i=8-11), so that the transistors Qi' (i=8-11) generate data of the right block RBK$_i$ (i=8-11) and transmit them to the corresponding bits of the data bus RD.

The operation of the barrel shift unit 5 of FIG. 4 will be explained with reference to FIGS. 12A through 12H.

That is, when the clock signal CLK is generated from the clock generator 8 (FIG. 3) as shown in FIG. 12A and the control signal CS1$_{in}$ is generated from the microprogram control circuit 3 (FIG. 3) as shown in FIG. 12B, the input latch circuits 51 and 51' are simultaneously enabled at time t$_1$ as shown in FIG. 12C, so that the input latch circuits 51 and 51' latch the same data from the data bus SD. On the other hand, the precharging signal $\overline{PRE}$ is made low as shown in FIG. 12D, and all the bits of the data bus RD are precharged at V$_{cc}$. Then, at time t$_2$, when the microprogram control circuit 3 generates the control signals C0 to C3 and C0' to C3' as shown in FIG. 12E, the 16-bit left shift unit 52 and the 8-bit right shift unit 52' are operated. After that, at time t$_3$, when the microprogram control circuit 3 generates the control signals C4 to C7 and C4' to C7' as shown in FIG. 12F, the 8-bit left same shift unit 53 and the 16-bit right shift unit 53, are operated. Further, at time t$_4$, when the microprogram control same circuit 3 generates the control signals C8 to C11 and C8' to C11' as shown in FIG. 12G, the left output control circuit 54 and the right output control circuit 54' are operated. As a result, an OR logic between the outputs of the left output control circuit 54 and the right output control circuit 54' is obtained at the data bus RD as shown in FIG. 12H. Note that the precharging signal $\overline{PRE}$ is made high to put the data bus RD in a floating state before the determination of the control signals C8 to C11 (C8' to C11').

Thus, according to the left output control circuit 54 and the right output control circuit 54, the data RD$_j$ of the j-th bit of the data bus RD is defined by $$RD_j = (LB_j \cdot C_j) \cup (RB_j \cdot C_j')$$

where LB$_j$ is the j-th bit of the left output control circuit 54;

C$_j$ is one of the control signals C8 to C11 applied to the j-th bit NOR circuit of the left output control circuit 54;

RB$_j$ is the j-th bit of the right output control circuit 54'; and

C$_j$ is one of the control signals C8' to C11' applied to the j-th bit NOR circuit of the right output control circuit 54'.

The control signals C0 to C11 (C0' to C11') are changed in accordance with the conversion of one word as shown in FIG. 2A, the conversion of a half word as shown in FIG. 2B, and the conversion of a byte as shown in FIG. 2C.

Figures 13A, 13B, 13C, 13D, 13E:
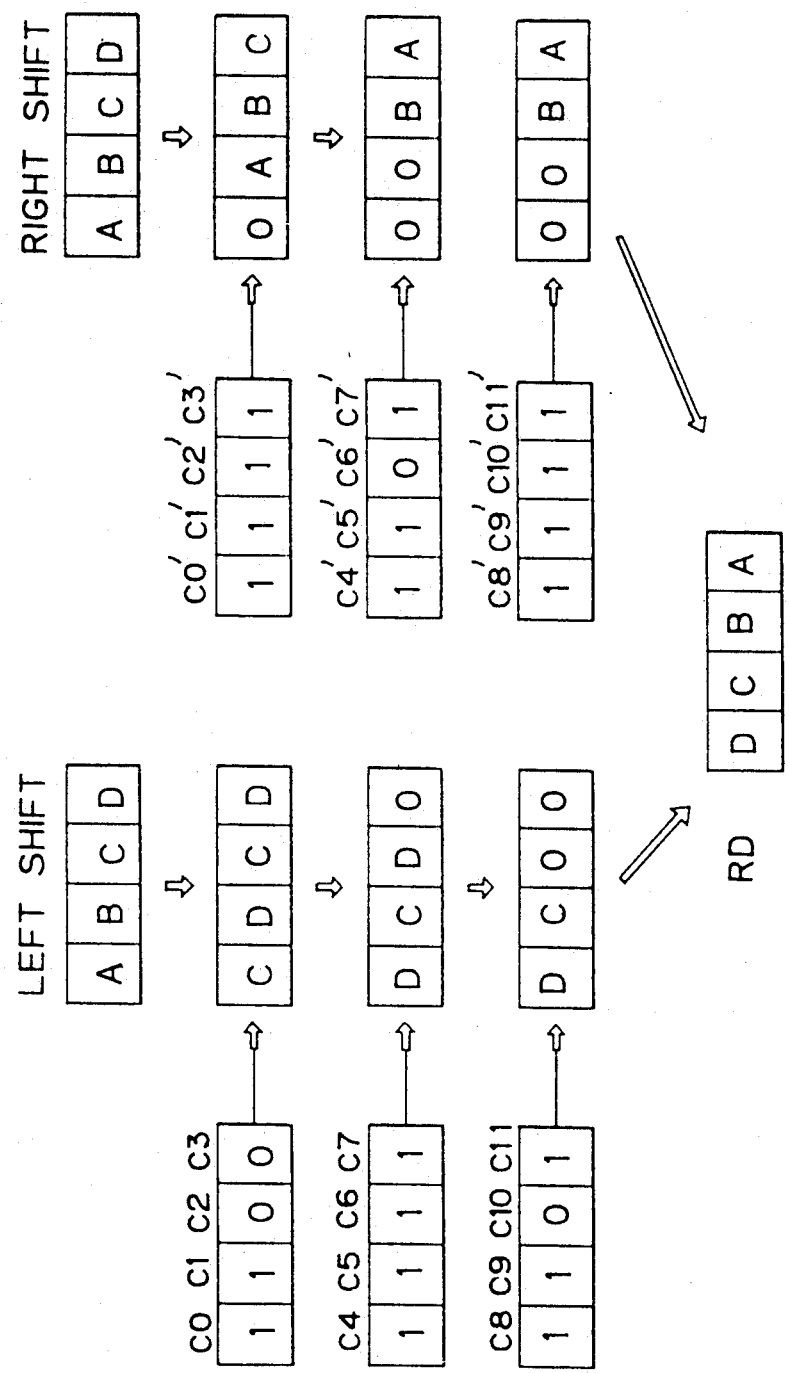
FIGS. 13A through 13E are diagrams explaining the operation of the circuit of FIG. 4 where a block reversing operation is carried out for a one-word reversion.

For example, in order to reverse the sequence of blocks for the conversion of one word as shown in FIG. 2A, the control signals C0 to C11 (C0' to C11') are given as shown in FIGS. 13A through 13E. That is, the sequence of blocks A, B, C, and D are latched in the input latch circuits 51 and 51' as shown in FIG. 13A. First, when "1", "1", "0", and "0" are given as the control signals C0, C1, C2, and C3, respectively, the 16-bit left shift unit 52 generates the sequence of blocks C, D, C, and D, as shown in FIG. 13B. Also, when "1", "1", "1", and "1" are given as the control signals C0', C1', C2', and C3', respectively, the 8-bit right shift unit 52' generates the sequence of blocks 0 (all bits are zero), A, B, and C, as shown in FIG. 13B. Second, when "1", "1", "1", and "1" are given as the control signals C4, C5, C6, and C7, respectively, the 8-bit left shift unit 53 generates the sequence of blocks D, C, D, and O, as shown in FIG. 13C. Also, when "1", "1", "0", and "1" are given as the control signals C4', C5', C6', and C7', respectively, the 16-bit right shift unit 53, generates the sequence of blocks O, O, B, and A as shown in FIG. 13C. Third, when "1", "1", "0", and "1" are given as the control signals C8, C9, C10, and C11, respectively, the left output control circuit 54 generates the sequence of blocks D, C, O, and O, as shown in FIG. 13D. Also, when "1", "1", "1", and "1" are given as the control signals C8', C9', C10', and C11', respectively, the right control circuit 54' generates the sequence of blocks O, O, B, and A as shown in FIG. 13D. As a result, the sequence of blocks D, C, B, and A is obtained at the data bus SD as shown in FIG. 13E.

Also, in order to reverse the sequence of blocks for the conversion of a half word as shown in FIG. 2B, the control signals C0 to C11 (C0' to C11') are also given as shown in FIGS. 14A through 14E. That is, the sequence of blocks A, B, C, and D are latched in the input latch circuits 51 and 51' as shown in FIG. 14A. First, when "0", "0", "0", and "0" are given as the control signals C0, C1, C2, and C3, respectively, the 16-bit left shift unit 52 generates the sequence of blocks A, B, C and D, as shown in FIG. 14B. Also, when "1", "1", "1", and "1" are given as the control signals C0', C1', C2' and C3', the 8-bit right shift unit 52' generates the sequence of blocks 0 (all bits are zero), A, B, and C, as shown in FIG. 14B. Second, when "0", "0", "1", and "1" are given as the control signals C4, C5, C6, and C7, respectively, the 8-bit left shift unit 53 generates the sequence of blocks A, B, D, and O, as shown in FIG. 14C. Also, when "0", "0", "0", and "0" are given as the control signals C4', C5', C6', and C7', respectively, the 16-bit right shift unit 53' generates the sequence of blocks O, A, O, and C, as shown in FIG. 14C. Third, when "0", "0", "1", and "1" are given as the control signals C8, C9, C10, and C11, respectively, the left output control circuit 54 generates the sequence of blocks A, B, D, and O, as shown in FIG. 14D. Also, when "0", "0", "1", and "1" are given as the control signals C8', C9', C10', and C11', respectively, the right control circuit 54' generates the sequence of blocks O, A, O, and C, as shown in FIG. 14D. As a result, the sequence of blocks A, B, D, and C is obtained at the data bus SD as shown in FIG. 14E.

Figures 15A, 15B, 15C, 15D, 15E:
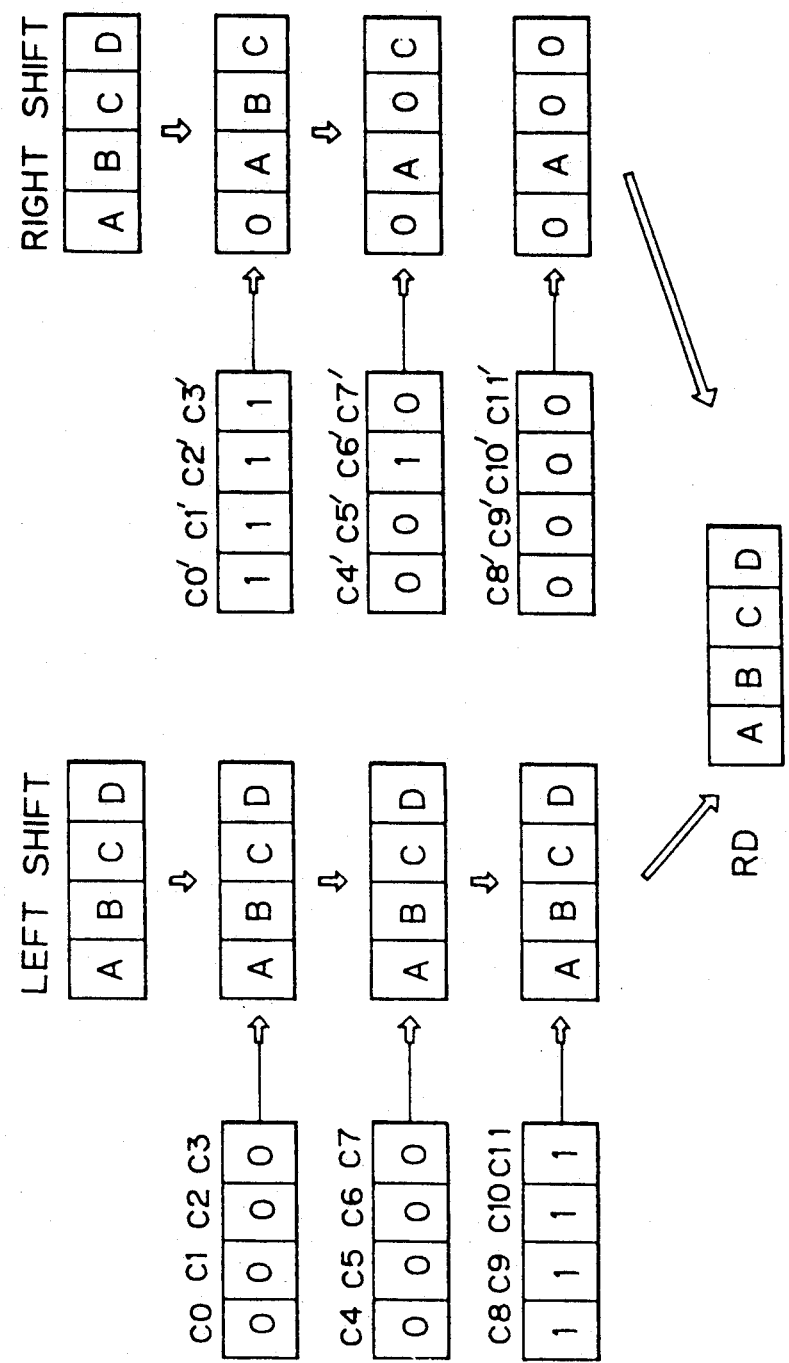
FIGS. 15A, 15B, 15C, 15D, and 15E are diagrams explaining the operation of the circuit of FIG. 4 where a block reversing operation is carried out for a one-byte reversion.

Further, in order to reverse the sequence of blocks for the conversion of a byte as shown in FIG. 2C, the control signals C0 to C11 (C0' to C11') are also given as shown in FIGS. 15A through 15E. That is, the sequence of blocks A, B, C, and D are latched in the input latch circuits 51 and 51' as shown in FIG. 15A. First, when "0", "0", "0", and "0" are given as the control signals C0, C1, C2, and C3, respectively, the 16-bit left shift unit 52 generates the sequence of blocks A, B, C, and D, as shown in FIG. 15B. Also, when "1", "1", "1", and "1" are given as the control signals C0', C1', C2', and C3', the 8-bit right shift unit 52' generates the sequence of blocks O, A, B, and C, as shown in FIG. 15B. Second, when "1", "1", "1", and "1" are given as the control signals C4, C5, C6, and C7, respectively, the 8-bit left shift unit 53 generates the sequence of blocks A, B, C, and D, as shown in FIG. 15C. Also, when "0", "0", "1", and "0" are given as the control signals C4', C5', C6', and C7', respectively, the 16-bit right shift unit 53, generates the sequence of blocks O, A, O, and O, as shown in FIG. 15C. Third, when "1", "1", "1", and "1" are given as the control signals C8, C9, C10, and C11, respectively, the left output control circuit 54 generates the sequence of blocks A, B, C, and D, as shown in FIG. 15D. Also, when "0", "0", "0", and "0" are given as the control signals C8', C9', C10', and C11', respectively, the right control circuit 54' generates the sequence of blocks O, A, O, and O, as shown in FIG. 15D. As a result, the sequence of blocks A, B, C, and D is obtained at the data bus SD as shown in FIG. 15E.

Note that the control signals C0 to C11 (C0' to C11') are not limited to the values as shown in FIGS. 13A through 13E, 14A through 14E, and 15A through 15E.

In FIG. 16, which is a detailed block circuit diagram of the bit reversing unit 6 of FIG. 3, the bit reversing unit 6 includes four bit reversing circuits 60, 61, 62, and 63 which are simultaneously operated in response to the control signal $CS2_{in}$ and $CS_{out}$, and the clock signal CLK.

The reversed blocks of data from the barrel shift unit 5 are supplied to the bit reversing circuits 60, 61, 62, and 63, each of which reverses the sequence of 8 bits within one block.

Figure 17:
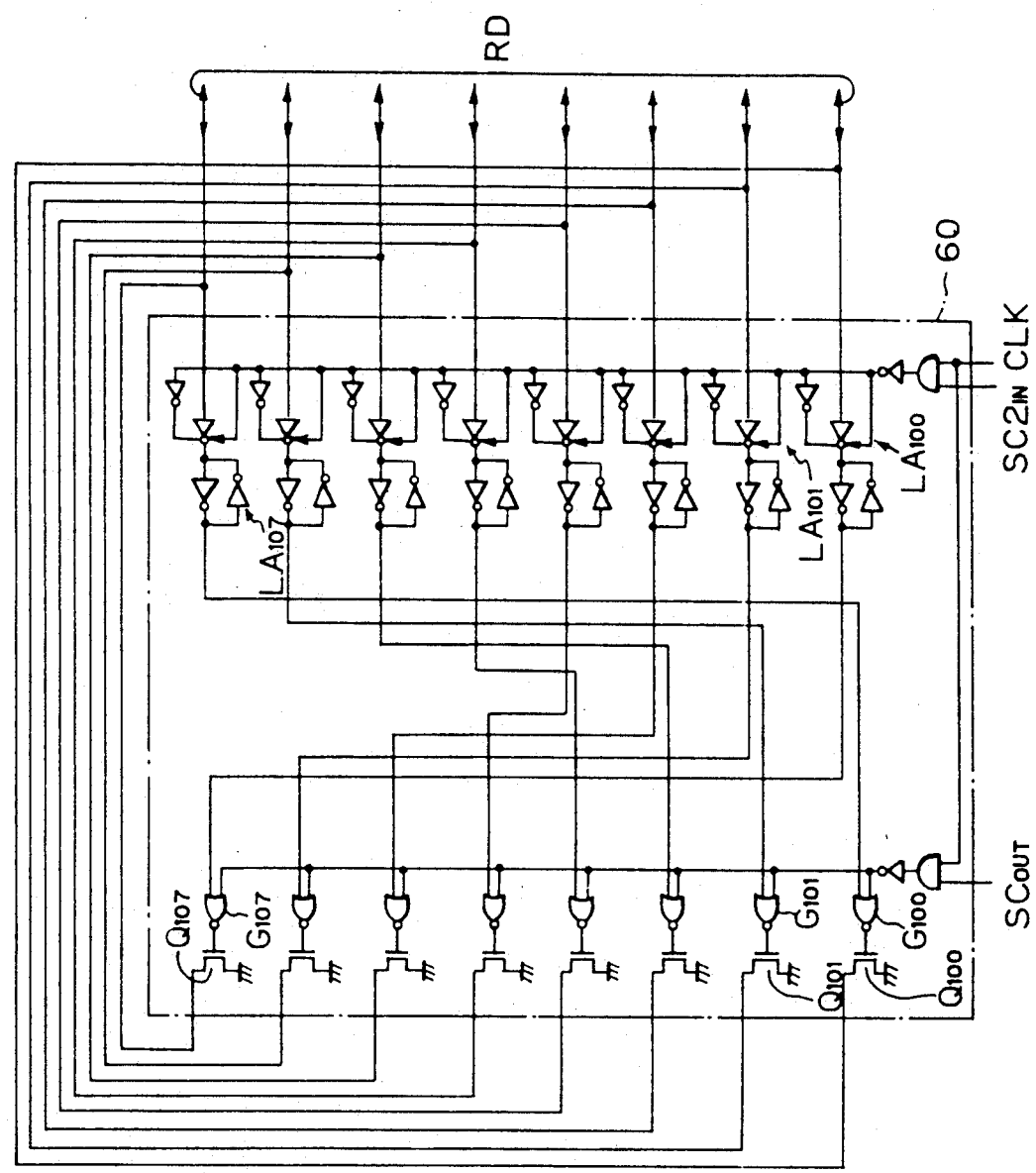
FIG. 17 is a circuit diagram of the bit reversing circuit of FIG. 16.

In FIG. 17, which is a detailed circuit diagram of the bit reversing circuit such as 60 of FIG. 16, the bit reversing circuit 60 includes eight latches $LA_{100}$, $LA_{101}$, ..., and $LA_{107}$ which have the same configuration as the latches of FIG. 5, and eight output circuits each of which has an NOR circuit such as $G_{100}$ and an enhancement-type transistor such as $Q_{100}$. Crossed-connections are provided between the eight latches and the output control circuits, so that the latches $LA_{100}$, $LA_{101}$, ..., and $LA_{107}$ are connected to the output control circuits ($G_{107}$, $Q_{107}$), ($G_{106}$, $Q_{106}$), ..., ($G_{100}$, $Q_{100}$), respectively.

The operation of the bit reversing circuit 60 of FIG. 17 is explained with reference to FIGS. 18A through 18E. That is, when the clock signal CLK is supplied from the clock generator 8 (FIG. 3) as shown in FIG. 18A and the clock signal $CS2_{in}$ is supplied from the microprogram control circuit 3 as shown in FIG. 18B, the non-reversed data of one block on the data bus RD which is already block-reversed by the barrel shift unit 5 is latched by the latches $LA_{100}$, $LA_{101}$, ..., and $LA_{107}$, as shown in FIGS. 18C and 18D. Thereafter, when the clock signal $CS_{out}$ is supplied from the microprogram control circuit 3 as shown in FIG. 18E, the output control circuits ($G_{100}$, $Q_{100}$), ($G_{101}$, $Q_{101}$), ..., and ($G_{107}$, $Q_{107}$) generate reversed bits of data and transmit them to the data bus RD.

Thus, the reversing operation of bits is carried out simultaneously within each block.

Note that, if the reversing operation of bits is directly carried out without providing the reversing means of blocks such as the barrel shift register, the above-mentioned crossed-connections are very complex, which remarkably increases the area they occupy.

As explained above, according to the present invention, since the conversion of bits is carried out by two-stepped configurations, i.e., a block reversing configuration and a bit reversing configuration, the execution time can be reduced without increasing the hardware. Also, since the reversing operation of blocks is adjusted, various types of reversing operations such as a one-word reversing operation, a half-word reversing operation, a byte reversing operation and the like are possible.

We claim:

1. A bit sequence reversing device for reversing a sequence of data having a plurality of blocks, each said block having a predetermined number of bits, comprising:

a block reversing unit for reversing the sequence of at least two of said blocks; and a plurality of bit reversing units, each corresponding to one of said blocks, each of said bit reversing units reversing the sequence of said predetermined number of bits in the corresponding block;

wherein said block reversing unit comprises a barrel shift unit, and wherein said barrel shift unit comprises:

first and second input latch circuits for receiving said data;

a series of left shift registers, connected to said first input latch circuit, for shifting an output of said first input latch circuit to a left direction, a series of right shift registers, connected to said second latch input circuit, for shifting an output of said second input latch circuit to a right direction;

a first output control circuit, connected to a post-stage of one of said series left shift registers, for selectively outputting data thereof; and a second output control circuit, connected to another post-stage of one of said series right shift registers, for selectively outputting data thereof, thereby said barrel shift unit generates a logical OR result between the outputs of said first and second output control circuits.

2. A device as set forth in claim 1, wherein each of said bit reversing units comprises:

said plurality of input latch circuits for receiving all the predetermined number of bits of the corresponding block; and said plurality of output control circuits, each connected to one of said input latch circuits for reversing all the predetermined number of bits of the corresponding block.

3. A microprocessor, comprising:

bus means (SD) for transmitting a plurality of block data, each including a plurality of bit data;

an instruction decoder for decoding instructions;

a microprogram control unit for generating a plurality of controlling signals, in accordance with an output signal output from said instruction decoder;

an arithmetic logic unit connected to said bus means;

a barrel shift unit connected to said bus means, for reversing a sequence of at least two of said block data, in accordance with said controlling signal;

wherein said barrel shift unit comprises:

first and second input latch circuits for receiving said data;

a series of left shift registers, connected to said first input latch circuit, for shifting an output of said first input latch circuit to a left direction;

a series of right shift registers, connected to said second latch input circuit, for shifting an output of said second input latch circuit to a right direction;

a first output control circuit, connected to a post-stage of one of said series left shift registers, for selectively outputting data thereof; and a second control circuit connected to a another post-stage of one of said series left shift registers, for selectively outputting data thereof, said bit-reversing unit receiving an output signal output from said barrel shift unit, and controlled by said controlling signal, wherein said bit-reversing unit corresponds to one of said data blocks and reverses the sequence of said bits predetermined number of in the corresponding block.

4. A microprocessor according to claim 3, further comprising: said bit-reversing unit connected to an additional bus means (RD), and a register file connected to said bus means (SD) and said additional bus means (RD), wherein an output terminal of said barrel shift unit is connected to said additional bus means (RD), while said bit-reversing unit reverses the sequence of the data received from said additional bus means and outputs reversed data to said additional bus means (RD).

5. A microprocessor according to claim 3, wherein said barrel shift unit selectively carries out an operation selected from a one-word reversing operation, a half-word reversing operation, and a non-reversing operation, on basis of said controlling signal.

* * * * *